(12) United States Patent
Bean

(10) Patent No.: US 10,708,222 B1
(45) Date of Patent: Jul. 7, 2020

(54) IPV6 ALIAS

(71) Applicant: EMC Corporation, Hopkinton, MA (US)

(72) Inventor: Thomas Alan Bean, San Jose, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 85 days.

(21) Appl. No.: 14/871,161

(22) Filed: Sep. 30, 2015

(51) Int. Cl.
*H04L 29/12* (2006.01)

(52) U.S. Cl.
CPC ...... *H04L 61/2007* (2013.01); *H04L 61/6059* (2013.01)

(58) Field of Classification Search
CPC ........... H04L 29/12216; H04L 61/2007; H04L 29/12018; H04L 29/12264; H04L 12/4641; H04L 49/25; H04L 61/2507; H04N 21/6402
USPC .......................................................... 370/392
See application file for complete search history.

(56) References Cited

U.S. PATENT DOCUMENTS

| | | | | |
|---|---|---|---|---|
| 2004/0215819 A1* | 10/2004 | Tsuruoka | ................ | H04L 45/10 709/238 |
| 2005/0108407 A1* | 5/2005 | Johnson | ................... | H04L 63/16 709/228 |
| 2006/0029097 A1* | 2/2006 | McGee | ................... | H04L 47/10 370/468 |
| 2009/0034540 A1* | 2/2009 | Law | ....................... | H04L 12/462 370/400 |
| 2009/0190590 A1* | 7/2009 | Agetsuma | ........... | H04L 67/1002 370/392 |
| 2010/0185755 A1* | 7/2010 | Hammam | ......... | H04L 29/12301 709/221 |
| 2010/0186021 A1* | 7/2010 | Dessertenne | ..... | H04L 29/12292 719/313 |

OTHER PUBLICATIONS

Gaia; R76 Administration Guide; Feb. 12, 2014; Check Point Softeare Technologies Ltd.*

* cited by examiner

*Primary Examiner* — Marsha D Banks Harold
*Assistant Examiner* — Elton Williams
(74) *Attorney, Agent, or Firm* — Workman Nydegger

(57) ABSTRACT

In one example, a method for configuring an interface includes creating an alias interface, where the alias interface is associated with a corresponding base interface. An alias address such as an IPv6 address is then created and assigned to the alias interface. The alias address is then added to the base interface, the base interface including a statically configured address. Finally, access to the base interface is enabled by way of the alias interface.

18 Claims, 7 Drawing Sheets

IPV6 ALIAS

FIELD OF THE INVENTION

Embodiments of the present invention generally concern data backup and restoration. More particularly, at least some embodiments of the invention relate to systems, hardware, computer-readable media, and methods directed to configuration of multiple IPv6 addresses using a unique interface.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

Due to the critical nature of backup systems and the associated data, it is important for backup data domains and other environments to be compliant with ever-changing industry standards and protocols. As well, compliance with the standards and protocols is not always simply a matter of good practice, but may also be mandated by customers, service level agreements (SLAs), regulatory bodies or governments. One area where compliance with such a protocol or specification has presented challenges concerns the move from Internet Protocol Version 4 (IPv4) to Internet Protocol Version 6 (IPv6).

In brief, IPv4 concerns an address space that includes internet protocol (IP) addresses available for use by hosts and other nodes in communicating with each other. Over time, all of the addresses in the IPv4 space have been consumed and the need to move to a larger address space has been recognized, resulting in the creation of IPv6. Because at least some of the configuration and operational requirements of IPv4 are different from those of IPv6, problems can arise when transitioning from the old address type to the new address type. Some of these problems concern the number of addresses that can be used by a network interface of a host, and the way in which those addresses are associated with that network interface.

For example, IPv4 specified that only one address could be assigned to an interface. If there was a need for multiple addresses to be associated with that interface, an IPv4 alias was used. The IPv6 approach also enables only a single static IP address to be added to an interface. However, there is often a need to be able to associate multiple IPv6 addresses with a single interface, and IPv6 addresses are not supported in the same way as IPv4 addresses.

Moreover, with IPv4, the user could simply give the interface another address or just set the address to be deleted to zero. In contrast, while IPv6 allows multiple different addresses to be used with a single interface, if the user wants to change between addresses, such as by deleting an existing address and replacing that address with a new one, the user has to remember the address and request that the address be deleted. This approach is further complicated because the network address size of 128 bits specified by IPv6 requires the user to remember and enter a relatively long address.

In light of problems and shortcomings such as these, it would be useful to be able to assign a single static IPv6 address to an interface, while also allowing multiple addresses to be associated with the static address. As well, it would be useful to enable a user to readily add, delete and change one, some, or all, of the multiple addresses. Finally, it would be useful to be able to associate multiple aliases, each with a respective IP address, with a single static address of an interface.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
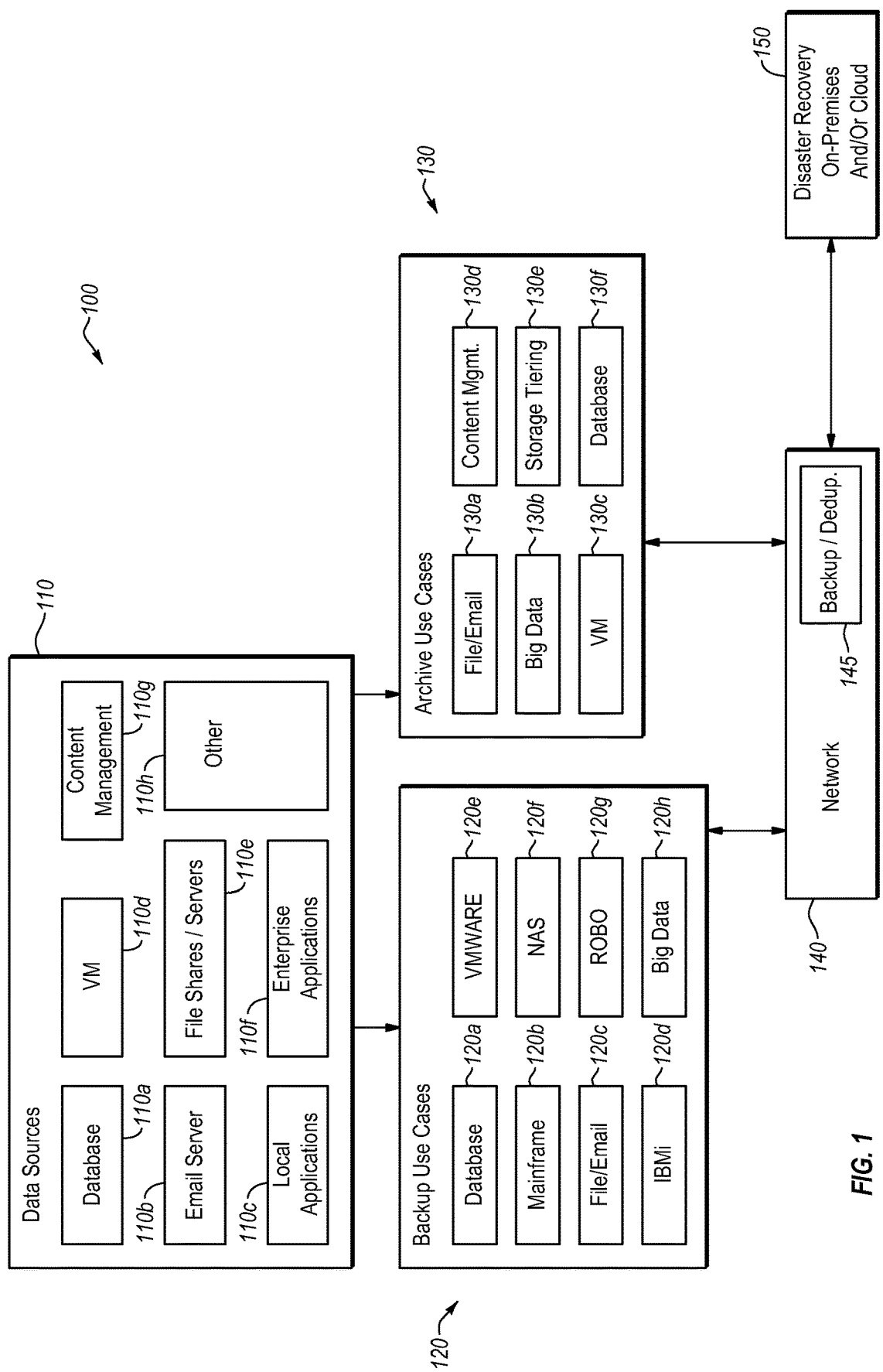
FIG. 1 discloses aspects concerning operating environments for at least some embodiments.

At least some embodiments of the invention generally concern data backup and restoration. More particularly, at least some embodiments of the invention relate to systems, hardware, computer-readable media, and methods directed to configuration of multiple IPv6 addresses using a unique interface. Embodiments of the invention can be employed in a variety of computing environments, examples of which include, but are not limited to, protection storage environments such as backup and archive environments.

It should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection.

At least some example embodiments involve one or more components, such as a host or switch for example, that can be part of a network, such as a WAN, LAN, or VLAN. The component may include one or more interfaces or ports, depending on the nature of the component, by way of which the component is able to communicate with other network entities, and each of the interfaces may have an associated static Internet Protocol (IP) address. One or more of the interfaces can be a bonded interface, VLAN interface, or physical interface, although none of these particular interfaces are required. As well, one or more of the interfaces can be an Ethernet interface, although that is not required. One or more of the interfaces can take the form of a physical communications port, or a software module such as a VLAN, for example.

In some embodiments, the network component can include a user interface, examples of which include a graphical user interface (GUI), such as a web browser, and command line interface (CLI), by way of which a user can configure the interface with one or more IPv6 addresses. One or more of the interfaces of the network component can additionally, or alternatively, be configured remotely, that is, by a device or other entity located remotely from the network component. The remote device can include a user interface such as a GUI, CLI, or other type of user interface.

At least one of the interfaces of the component can include multiple alias interfaces, each of which may also be referred to herein simply as an 'alias.' Each of the aliases has a respective IPv6 address that is different from the static IP address of the interface. Thus, for example, multiple users or groups of users can each access the interface by way of a respective alias. Among other things then, the use of multiple aliases enables a degree of isolation as between users or groups of users that communicate with the component by way of the interface. Additionally, or alternatively, each alias can be specific to a particular application, or group of applications. In some embodiments, at least one alias is accessible only by a single assigned user or group of users while in the same, or other, embodiments, a single alias can be accessible by multiple different users or groups of users.

In operation, a user can access a configuration application by way of the user interface and can modify the configuration of one, some, or all, of the interfaces of the component by making changes concerning one or more aliases. For example, the user can add one or more aliases to the interface, delete one or more aliases from the interface, and/or modify one or more aliases associated with the interface. As well, the user can use an alias name to bring a particular alias up or down, that is, enable or disable that particular alias. While the configuration application can present the aliases to the interface, those aliases may not be evident from the kernel perspective. That is, the kernel may only indicate the interfaces with which those aliases are associated.

Advantageously then, embodiments of the invention provide the ability to readily configure a single interface, having a static IP address, with multiple IPv6 aliases that are each associated with a corresponding IPv6 address. As well, the IPv6 aliases can be easily configured or reconfigured by way of local and/or remote interfaces. Finally, the user, through an application, can refer to a single IPv6 (128 bit) address by referring to the name of the short alias, thus reducing the probability of mistakes.

A. Example Operating Environments

In general, embodiments of the invention may include and/or be implemented in an operating environment that includes one or more clients that include data that is desired to be protected in some way. The clients can communicate with a backup server and may include one or more applications which generate, and/or cause the generation of, data which is desired to be backed up for later restoration to the client and/or one or more other target machines. The clients and the target machines can be physical machines or virtual machines (VM), though neither type of machine is required for any embodiment. As used herein, the term 'data' is intended to be broad in scope and embraces, by way of example and not limitation, data segments, data chunks, data blocks, atomic data, emails, objects of any type, files, contacts, directories, volumes, and any group of one or more of the foregoing.

With the foregoing in mind, attention is directed now to FIG. 1 which discloses one example of an operating environment that may be suitable for one or more embodiments of the invention. In FIG. 1, the example operating environment is shown in conceptual form and denoted at 100. In this example, there may be a variety of data sources 110 that generate data that is desired to be protected, such as by way of one or more backup and/or archive processes. The data can be deduplicated prior to protection by backup/archive processes. The data sources 110 can include, for example, a database 110a, email server 110b, one or more local applications 110c, virtual machines (VM) 110d, file shares/servers 110e, enterprise applications 110f, content management 110g, and any other 110h entity, application, or device that generates data that is desired to be protected.

Data generated by one or more of the data sources 110 can be protected in connection with various backup use cases 120 and/or archive use cases 130. Some example backup use cases 120 can include database 120a, mainframe 120b, file/email 120c, IBMi 120d, VMWare 120e, Network Attached Storage (NAS) 120f, Remote Office Branch Office (ROBO) 120g, and EMC Corp. Big Data 120h. Some example archive use cases 130 include file/email 130a, EMC Corp. Big Data 130b, VMs 130c, content management 130d, storage tiering 130e, and database 130f.

Whether an archive use case, backup use case, and/or other type of use case, the data to be protected can be communicated to a network 140, which can be a WAN, LAN, or any other type of network. The network 140 may include one or more devices, such as a backup server and/or archive server that run applications 145 for backing up and/or deduplicating data. As indicated in FIG. 1, the backup data can be backed up by a disaster recovery facility 150 that can reside locally or at a remote location.

Figure 2:
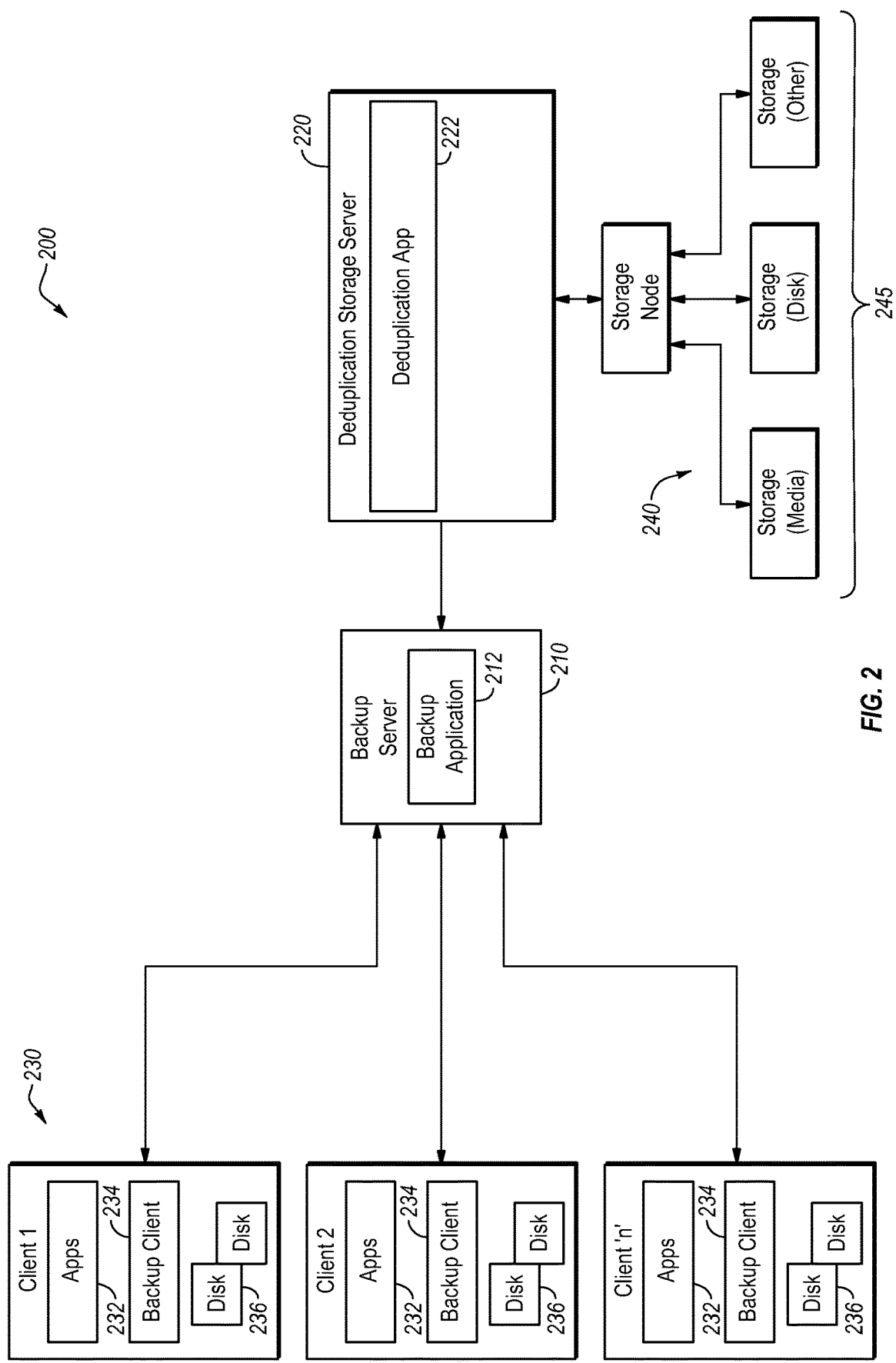
FIG. 2 discloses aspects of a particular operating environment for at least some embodiments.

Turning now to FIG. 2, one particular example of an operating environment in which embodiments of the invention can be employed is denoted generally at 200. The operating environment 200 may be a network such as a local area network, a wide area network, or any other networked configuration, such as the network 140 of FIG. 1 for example. Moreover, the operating environment 200, or any group of one or more of its elements, may comprise, form an element of, or constitute, a cloud computing environment. The operating environment 200 may include various devices including servers and other computing devices that are interconnected. The operating environment 200 may employ a variety of communication media, such as hardwire, wireless, or some combination thereof. In some instances, some or all of the operating environment 200 may comprise an optical communication network.

As indicated in FIG. 2, the example operating environment 200 includes a backup server 210 configured for communication with a deduplication server 220, one or more clients 230, and a storage node 240 that may comprise an element of a cloud computing environment. In some embodiments, the respective functionalities of the deduplication server 220 and backup server 210 may be combined in a single server. In yet other environments, the deduplication server 220 is omitted and respective instances of a deduplication application 222 reside on one or more of the clients 230, each of which communicates with the backup server 210. The storage node 240, which may be a cloud storage node, can communicate with, or include, various types of storage 245, In general, backups of one or more of the clients 230 can be made by cooperation between the backup server 210 and the client 230, and the backups can then be stored by the backup server 210 at the storage node 240. Subsequently, one or more of the stored backups can be restored to one or more of the clients 230 and/or any other target(s). The backup server 210, deduplication server 220, clients 230, storage node 240 and/or target(s) may be physical machines, virtual machines (VM), containerized machines, or any other suitable type of device. As well, some or all of the storage 245 can be implemented as physical or virtual devices. Finally, while not specifically illustrated, the storage node 240 can include one or more database servers that communicate with one or more data stores. The database servers can store metadata, such as pointers for example, that point to data stored in the data store(s).

In one alternative to the arrangement of FIG. 2, the storage node 240 can be replaced with, or constitute, a primary storage device that communicates with the backup server 210. The primary storage device, in turn, may communicate with a data domain, which may incorporate the EMC Corp. DataDomain backup technology, that includes one or more storage devices where backups can be retrievably stored. The storage devices of the data domain can include, for example, an onsite retention storage device or array, and also an offsite disaster recovery (DR) storage device or array.

With particular reference first to the backup server 210, some embodiments may employ a backup server 210 in the form of an EMC Avamar server or NetWorker server, although the scope of the invention is not limited to those example servers. The backup server 210 includes a backup application 212 that participates in the generation of backups. Example implementations of the backup application 212 are discussed in more detail below.

One or more of the nodes, such as client 230, with which the backup server 200 communicates can take the form of a server. It is not required that the server be any particular type of server. One or more of the client(s) 230 include any of various applications 232 that generate data that is desired to be protected. As well, the client(s) 230 can each include a respective instance of a backup client 234 that generally operates in cooperation with the backup application 212 of the backup server 210 to create one or more backups that include data that is resident on storage media 236, such as disks for example, of the client 230. The backups thus created can be communicated to the storage node 240 for storage and subsequent retrieval.

Example embodiments can be employed in a variety of different devices and applications, examples of which the following EMC products related to backup and deduplication devices, namely, EMC Data Domain, EMC Avamar, and EMC CloudBoost. However, the scope of the invention is not limited to backup devices and, accordingly, yet other embodiments can be employed in storage devices such as EMC XtremIO, EMC VNX, EMC VMAX, EMC Isilon, EMC Atmos, and EMC Elastic Cloud Storage. Finally, embodiments of the invention can be applied to any storage medium, examples of which include, but are not limited to, memory, flash, hard disk and tape.

C. Example Host Configuration

Figure 3:
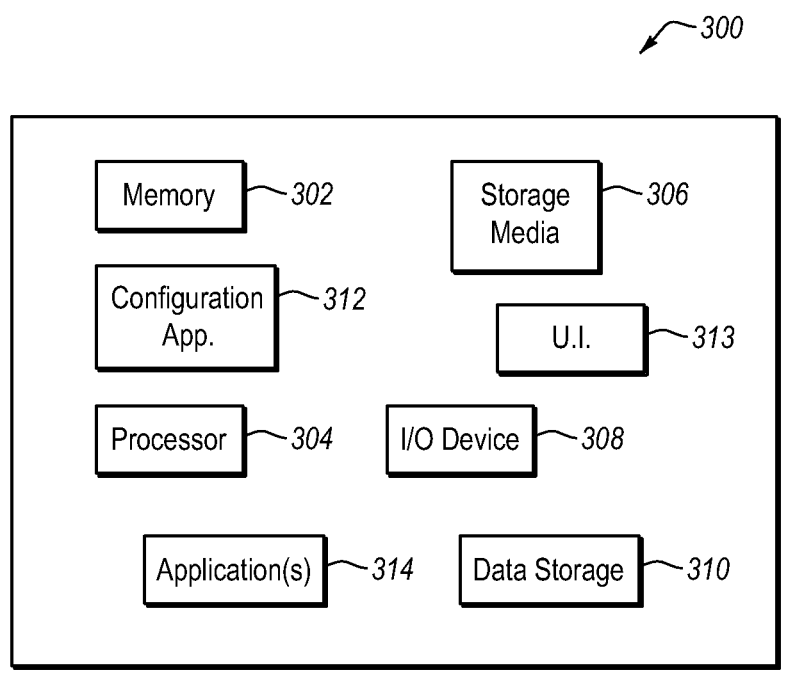
FIG. 3 discloses aspects of an example host configuration.

With reference briefly to FIG. 3, one or more of the backup server 210, deduplication server 220, clients 230, or storage node 240 can take the form of a physical computing device, one example of which is denoted at 300. In the example of FIG. 3, the computing device 300 includes a memory 302 such as RAM, ROM, or a combination of those, one or more hardware processors 304, non-volatile and non-transitory storage media 306, I/O device(s) 308, and data storage 310. A configuration application 312 may be provided that is accessible locally by user interface (UI) 313 and/or remotely. As disclosed elsewhere herein, the configuration application 312 is operable to, among other things, add multiple IPv6 aliases to a physical interface that has a static IP address. As well, one or more applications 314 are provided that comprise executable instructions. Such executable instructions can take the form, for example, of one or more of a backup application, a backup client, or a deduplication application. Finally, the UI 313 device can be a GUI, such as a web browser for example, or could take the form of a CLI.

D. Aspects of an Example Interface

Figure 4A:
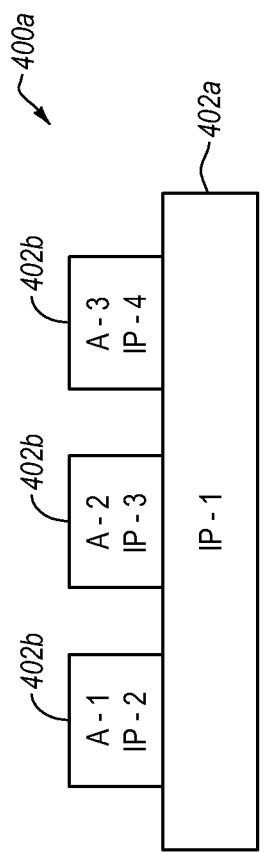
FIGS. 4a and 4b disclose aspects of some example interface configurations.

With reference now first to FIG. 4a, details are provided concerning a simplified depiction of an interface that includes multiple IPv6 aliases, one example of which is denoted generally at 400a. A more detailed example is discussed below in connection with FIGS. 5, 6a and 6b. In general, the interface 400a includes a physical interface 402a. Physical interfaces such as the physical interface 402a can be part of a device such as host, switch, router, server, or any other device that is intended for communicating with other devices and nodes. As such, the physical interface 402a may be compliant with any of a variety of communication standards and protocols, examples of which include, but are not limited to, Ethernet, Gigabit Ethernet, SONET (Synchronous Optical Network), ATM (Asynchronous Transfer Mode), and POP (Post Office Protocol). The foregoing discussion likewise applies to the physical slave interfaces 404b and 406b in FIG. 4b, discussed below.

A variety of different configurations of physical interfaces are possible. For example, in FIG. 4a, there is a single physical interface 402a which has a corresponding static IP address, denoted as IP-1. The physical interface may sometimes also be referred to as the 'base interface.' In addition to the physical interface 402a, the interface 400a also includes a plurality of alias interfaces 402b, which can be configured, for example, by a user with a configuration application. In the illustrated example, one, some, or all of the alias interfaces 402b are IPv6 alias interfaces. As shown, each of the alias interfaces A-1, A-2 and A-3 has a corresponding IP address, namely, IP-2, IP-3 and IP-4. Thus, one advantage of embodiments of the invention is that multiple alias interfaces, such as IPv6 interfaces for example, can be added to a physical interface that has a single static IP address. Moreover, a relatively large number of alias interfaces can be added in some embodiments, such as up to 500, or 1000, or more, for example.

Not only does the use of IPv6 alias interfaces ensure compliance of the associated system/components with the IPv6 standards, but the use of multiple alias interfaces may provide various benefits as well. For example, the use of multiple alias interfaces can help to isolate user traffic, and in a secure multi-tenancy (SMT) environment can help to maintain security and isolation as between users and/or groups of users. The use of multiple alias interfaces can also help with network traffic load balancing on the physical interface and can reduce, or eliminate, the need to reorder data packets transmitted to/from the physical interface. In some embodiments, the load balancing can be implemented by way of a hash that uses the respective IP addresses of the connections to balance the network traffic on a per connection basis. As a further example, multiple alias interfaces provide flexibility to handle multiple subnets on a single interface, and to allow floating IP addresses in the event of a failover involving an alias or other interface. Finally, and as noted elsewhere herein, the alias interfaces can be readily added, deleted, modified, activated, or deactivated, by a user, locally and/or remotely.

Figure 4B:
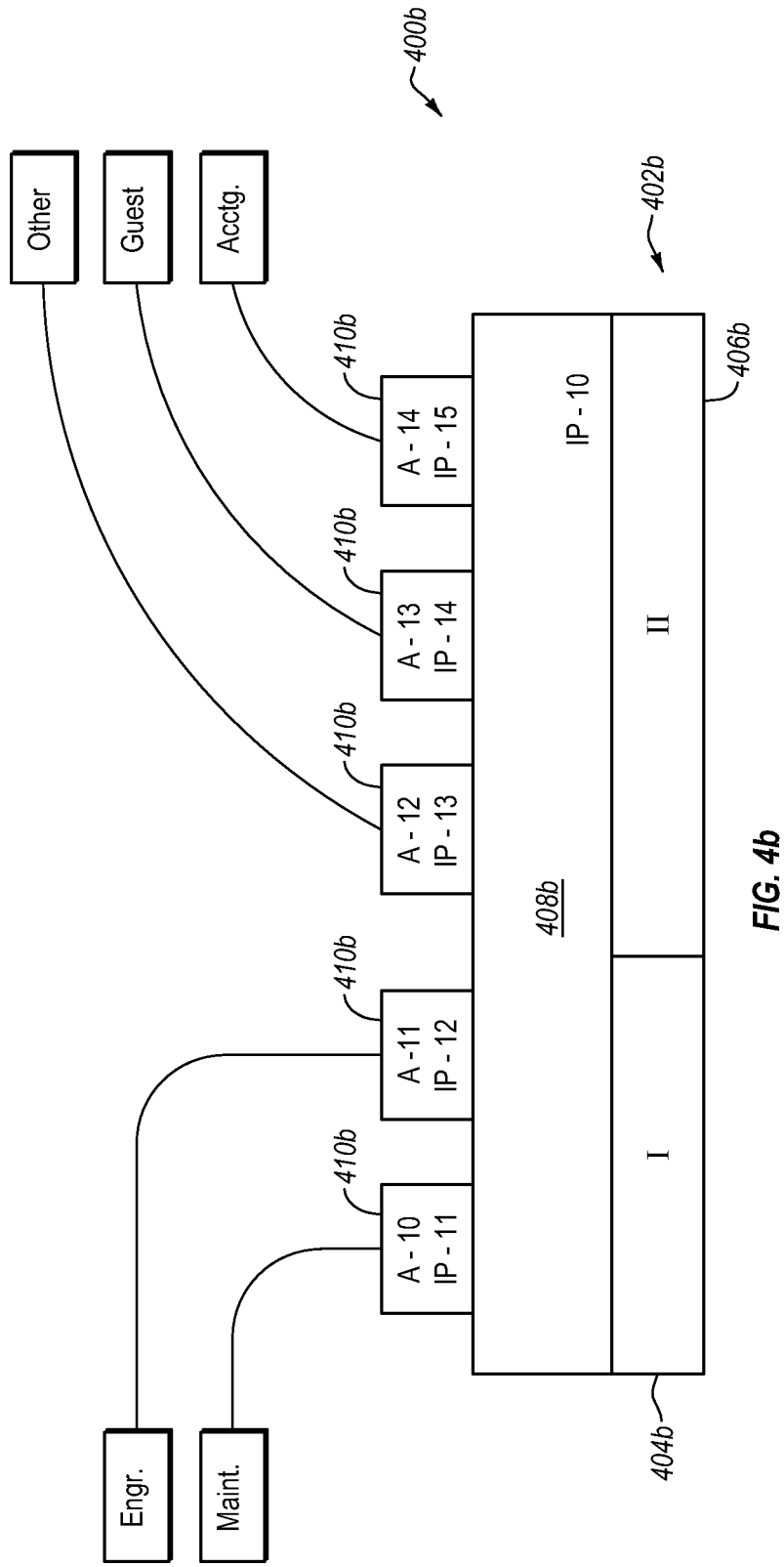

With reference now to the example of FIG. 4b, the physical interface 402b includes physical first and second slave interfaces 404b and 406b. While only two slave interfaces are illustrated, it should be understood that more than two slave interfaces can be bonded together to form a bonded interface. Accordingly, the scope of the invention is not limited to the example of FIG. 4b. As shown in FIG. 4b, the slave interfaces 404b and 406b are bonded together to form the virtual bonded interface 408b. In some embodiments at least, the bonded interface 408b is a virtual element, rather than a physical device and, as such, the bonded interface 408b represents the physical slave interfaces 404b and 406b as a single unified interface.

It should be noted that while the bonded interface 408b, similar to the physical interface 402a, has a corresponding static IP address, denoted as IP-10, the slave interfaces 404b and 406b do not have their own IP addresses. As well, the slave interfaces 404b and 406b can have the same configuration, such as Ethernet for example, or the slave interfaces can have different respective configurations. In one illustrative example, the slave interface 404b is a 5GigE interface, and the slave interface 406b is a 10GigE interface.

In the example of interface 400b, there are a total of five alias interfaces 410b, namely, A-10, A-11, A-12, A-13 and A-14, one, some, or all of which can be IPv6 alias interfaces. Correspondingly, each of the alias interfaces 410b has a respective alias IP address, namely, IP-11, IP-12, IP-13, IP-14 and IP-15, respectively. In the example illustrated embodiment, the alias interfaces 410b can each be allocated to a user or group of users. Thus, for example, an alias interface 410b with its own IP address can be assigned to each of a maintenance group, an engineering group, an accounting group, a guest user or users, and to any other user that may require access. Each of the alias interfaces 410b can be customized in various ways, such as in terms of bandwidth for example, that are specific to the needs of the user of that interface.

E. Aspects of Configuration and Kernel Perspectives

Figure 5:
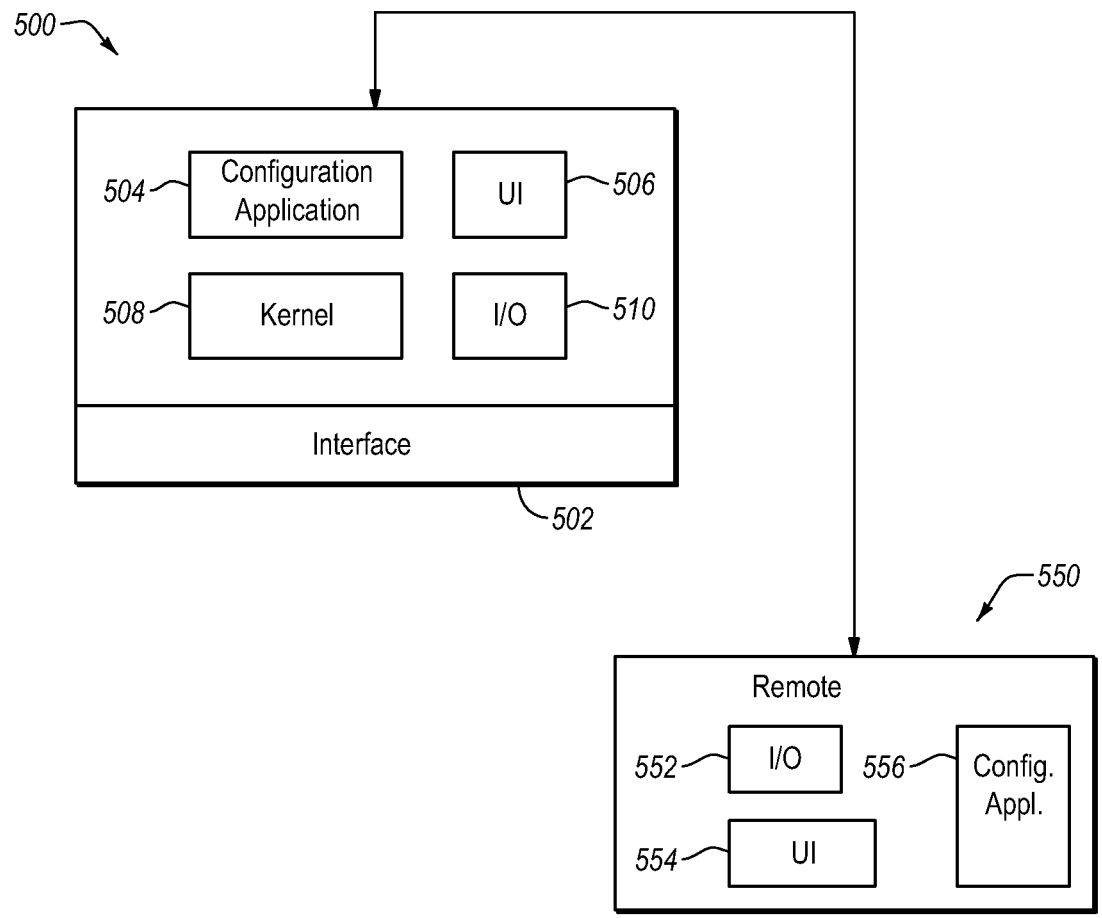
FIG. 5 discloses aspects of an example arrangement of a configuration application.

With reference now to FIG. 5, details are provided concerning an example arrangement in connection with which alias interfaces can be used to add multiple addresses, such as IPv6 addresses, to a physical interface with a single static IP address. In the example arrangement of FIG. 5, a computing entity 500 such as a host or client in a network for example, includes an interface 502 that can be configured and/or reconfigured by a user with a configuration application 504. Accordingly a UI 506, examples of which are disclosed herein, is provided that enables a user to interact with the configuration application 504. As discussed in further detail elsewhere herein, a kernel 508 of the computing entity 500 is also involved in the configuration of the interface 502. Where the configuration of the interface 502 is to be accomplished remotely, an I/O device 510 can be provided that enables the computing entity 500 to communicate with a remote device, such as the remote device 550.

In particular, the interface 502 can be configured locally at the computing entity 500 and/or remotely at the remote device 550 which can likewise be a computing entity. The remote device 550 can include an I/O device 552, a UI 554, and, in some embodiments, an instance of the configuration application 556. Thus, the remote device 550 can, in some embodiments, access the configuration application 504 resident on the computing entity 500 or, alternatively, the remote device 550 can operate a local copy of the configuration application 556 and transmit appropriate commands to the computing entity 500 to effect the configuration of the interface 502.

Figure 6A:
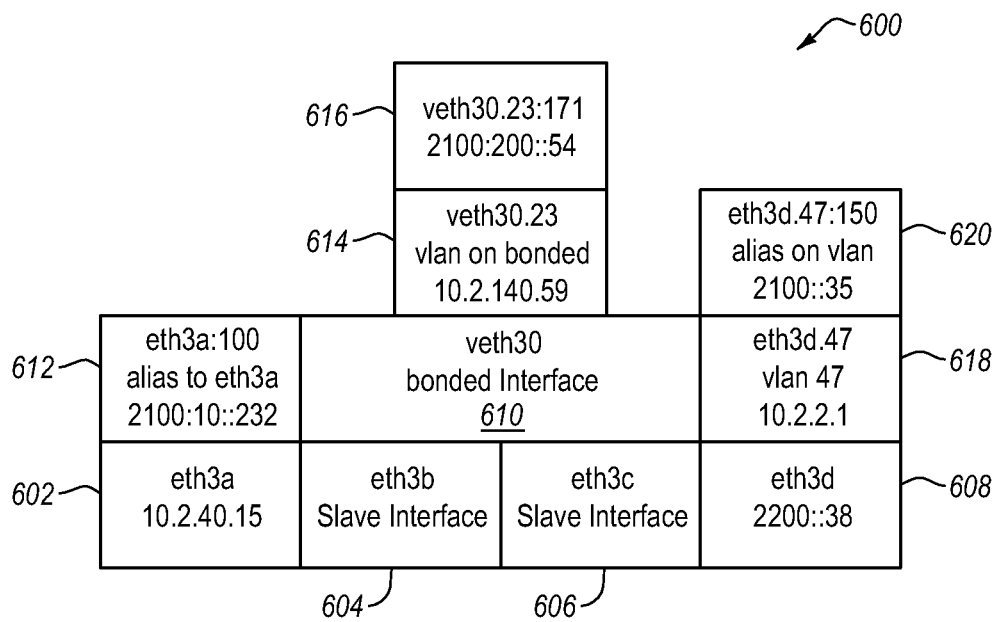
FIG. 6a discloses aspects of an example interface considered from the perspective of a configuration application.
Figure 6B:
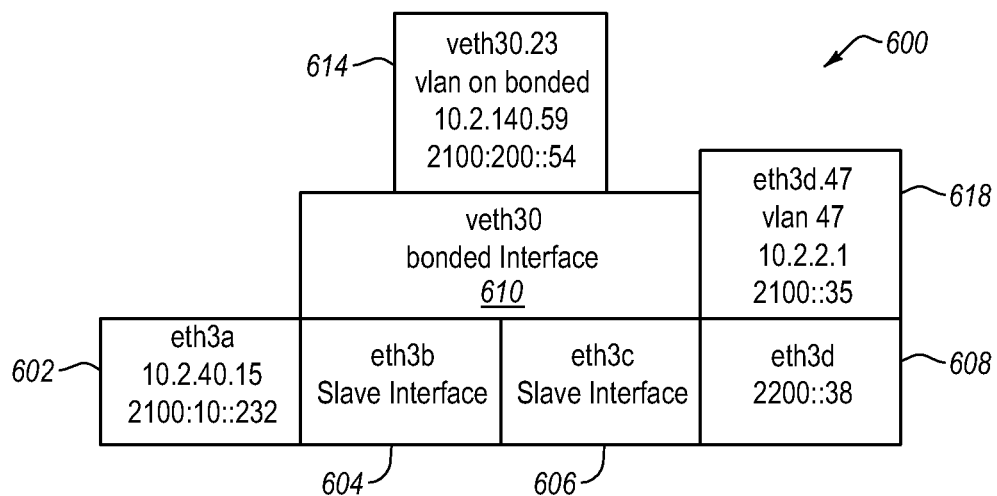
FIG. 6b discloses aspects of an example interface considered from the perspective of a device kernel.

Turning next to FIGS. 6a and 6b, details are provided concerning some example interfaces. With reference first to FIG. 6a, the interface configuration 600 is illustrated from the perspective of a configuration application such as disclosed in FIG. 5 for example. In the example of FIG. 6a, the interface configuration 600 includes a plurality of physical interfaces, namely, 602, 604, 606 and 608, all of which are illustrated as Ethernet interfaces, although that is not required. The physical interfaces can also be referred to as base interfaces. In general, each of the physical interfaces has only a single statically configured address, at least from the perspective of the configuration application, although the address type can vary from one physical interface to another. By way of illustration, the physical interface 602 has an IPv4 address, while the physical interface 608 has an IPv6 address. In contrast, neither of the slave interfaces 604 and 606 has an IP address. Instead, the slave interfaces 604 and 606 are bonded together to form a bonded interface 610. The bonded interface 610 in this example is a virtual Ethernet bonded interface, indicated by the notation 'veth.' Bonding can be used, for example, to aggregate bandwidth and/or to provide fault tolerance if a link or connection fails. Although not specifically illustrated in FIG. 6a, the bonded interface 610 can have an IP address associated with it, such as an IPv6 address.

In addition to the physical interfaces, the interface configuration also includes various alias interfaces that relate to the physical interfaces in a variety of different ways. In general, and as discussed elsewhere herein, each of the alias interfaces includes an associated alias address, such as an IPv6 address for example, and the alias addresses can be brought up or down by reference to their name(s). As shown, an alias interface 612 is linked to the physical interface 602. In the illustrated example, the alias interface 612 is an IPv6 alias interface, that is, the alias interface 612 has an IPv6 alias address. This is indicated by the reference 'alias to eth3a,' while the colons in the IP address of the alias interface 612, that is, 2100:10::232, indicate that the example alias interface 612 is an IPv6 alias interface. It should be noted that while only a single alias interface 612 is shown as being associated with the physical interface 602, in other embodiments, multiple alias interfaces, each with their own alias address, can be associated with a physical interface such as the physical interface 602.

With continued reference to FIG. 6a, other possible configurations of interfaces are also disclosed. For example, a VLAN interface 614 can be provided on the bonded interface 610, although in other embodiments, an alias interface such as an IPv6 interface for example, can be provided on the bonded interface. In the illustrated example, the VLAN interface 614 is a virtual Ethernet interface that has an IPv4 address and is configured to enable communication with devices on a VLAN 23. In at least some embodiments, a VLAN such as VLAN 23 can be dedicated to a particular user or group of users. As further indicated in FIG. 6a, an alias interface 616 can be provided on the VLAN interface 614. The alias interface 616 can be a virtual Ethernet interface with an IPv6 alias address.

Finally, in another variation, a VLAN interface 618 can be provided on the physical interface 608. The VLAN interface 618 can be linked to an physical Ethernet interface, although that is not required, and may have an IPv4 address to be configured to allow communication with other devices on VLAN 47 (not shown). The VLAN interface 618 cannot communicate with interfaces on VLAN 23 (not shown), including VLAN interface 614 which is shown. As further indicated in FIG. 6*a*, an alias interface 620 can be provided on the VLAN interface 618. In the illustrated example, the alias interface 620 is linked to a VLAN interface with an IPv6 address. The other VLANs can communicate through the IP address of the alias.

As will be apparent from FIG. 6*a* and the corresponding discussion, a variety of different types and configurations of interfaces can be defined and implemented. Such interfaces can include one or more physical, bonded, and/or alias interfaces that each have an associated alias address. As well, some of such interfaces can be virtual rather than physical. Further, one or more of the interfaces can be an IPv4 interface or an IPv6 interface. Moreover, a given physical interface can be associated with a single alias interface, or with an alias interface and at least one additional interface. Finally, one or more of the interfaces can be an Ethernet interface, although as noted elsewhere herein, that is not required and the scope of the invention is not limited to any particular communication standard or protocol.

With continued reference to FIG. 6*a*, and directing attention now to FIG. 6*b* as well, details are provided concerning the interface configurations of FIG. 6*a* as seen from the perspective of the kernel in the device that includes those interface configurations. As is apparent from FIG. 6*b*, the alias interfaces 612, 616 and 620 are not visible at the kernel, although the alias addresses are shown at the kernel as associated with a corresponding base interface. That is, the IPv6 alias addresses effectively only exist at the configuration level, and not at the kernel. Rather, only the base interfaces 602, 610, 612, 614 and 618 are visible.

By way of illustration, the alias interface 612 is visible at the configuration level in FIG. 6*a*, but not at the kernel in FIG. 6*b*. However, the IPv6 alias address of the alias interface 612, namely, 2100:10::232, can be seen on the base interface 602 in FIG. 6*b*, along with the IPv4 address of the base interface 602, namely, 10.2.40.15. thus, and as discussed in further detail elsewhere herein, the kernel is able to manipulate the various addresses associated with a base interface, and can do so in response to commands, such as add/del commands for example, received from the configuration application.

F. Aspects of Some Example Methods

Figure 7:
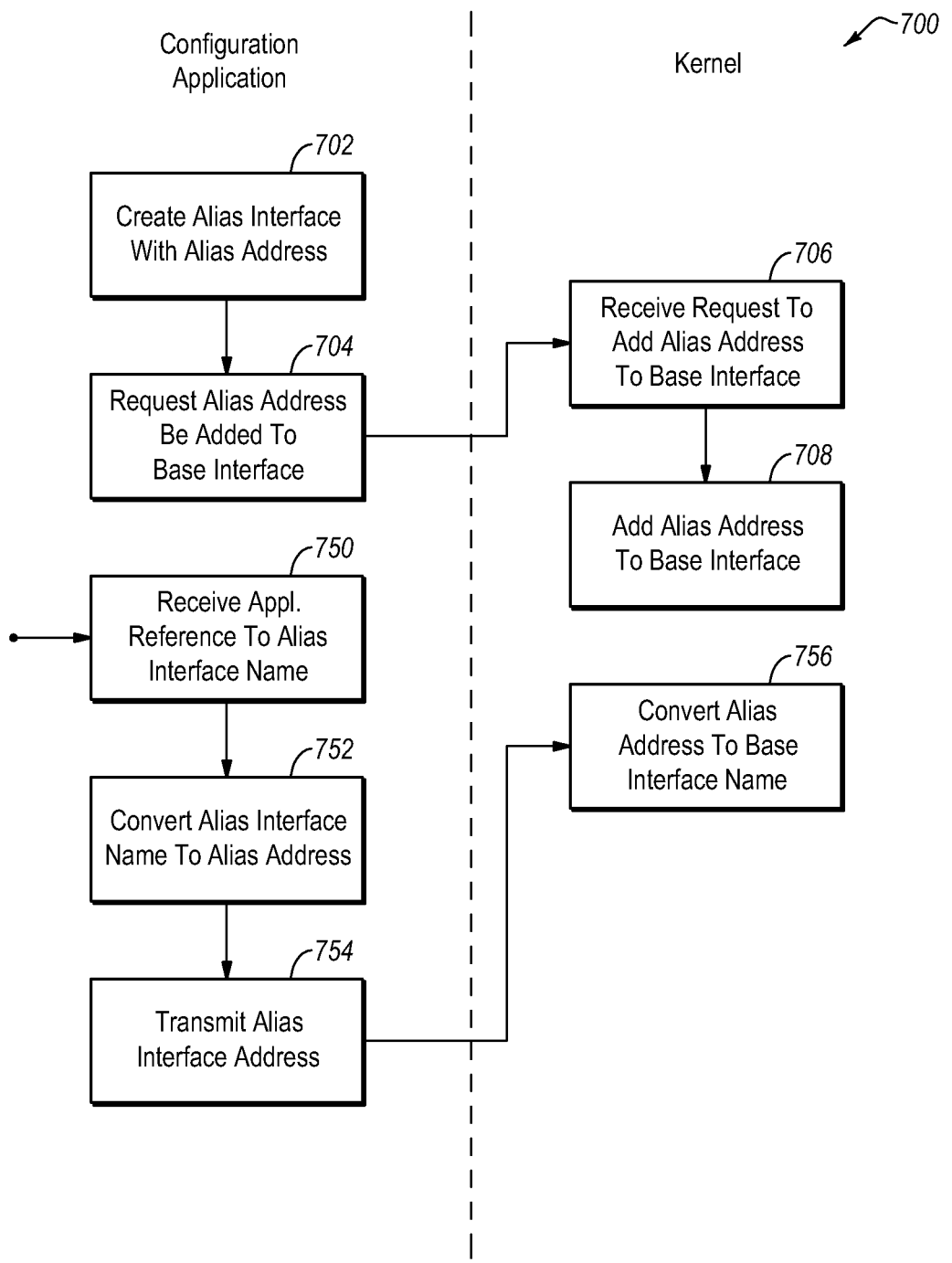
FIG. 7 is a flow chart directed to an example method for configuring and using an interface.

With reference now to FIG. 7, details are provided concerning some example methods concerning the configuration of a base interface with multiple IPv6 interfaces that each have a respective IPv6 address. Embodiments of the methods can be implemented within the device or other entity having a base interface to which multiple IPv6 addresses are to be assigned. The device or other entity can be any of the devices and entities disclosed herein, including a host, server, or switch, for example. At least some embodiments of the methods are implemented in whole or in part by a configuration application residing at the entity to whose interface multiple IPv6 addresses will be assigned. The configuration application can cooperate with the device kernel to implement the method. In other embodiments, the configuration application can reside at a location remote from the device whose interface is to be configured, and as such, the method can be implemented by cooperation between the remote configuration application and the local kernel. The scope of the invention is not limited to the aforementioned example implementations. More generally, the functionalities included in the disclosed methods can be allocated amongst various computing entities or devices in any way that enables the implementation of the method.

In general, embodiments of the disclosed method are performed in connection with a base interface that has a single statically configured address. That base interface can be, for example, a physical interface, a virtual interface, or a VLAN. In at least some embodiments, the method involves the use of application level IPv6 aliases to add corresponding IPv6 addresses to an interface. As a result, a user can add IPv6 addresses to an alias, and alias creation and destroy can be performing using a suitable command, such as 'net config' for example, and the base interface will contain multiple IPv6 static addresses in the kernel. The disclosed methods can involve the use of IPv4 addresses as well.

As well, one or more embodiments of the disclosed methods can be implemented in connection with any one or more of a variety of different scenarios concerning addresses to be added to a base interface. Some example scenarios include: (1) no IP address is assigned to the base interface and an IPv6 address is given; (2) no IP address is assigned to the base interface and a Dynamic Host Configuration Protocol (DHCP) IPv6 address is requested; (3) an IPv4 address is assigned to the base interface and an IPv6 address is given; (4) an IPv4 address is assigned to the base interface and a DHCP IPv6 address is requested; (5) an IPv6 address is assigned to the base interface and an IPv6 address is given; (6) an IPv6 address is assigned to the base interface and a DHCP IPv6 address is requested; (7) an IPv6 address is assigned to the base interface and an IPv4 address is given; and, (8) an IPv6 address is assigned to the base interface and a DHCP IPv4 address is requested. As such, embodiments of disclosed methods can perform one, some, or all, of the following processes. As noted above, the configuration application can facilitate performance of these processes in cooperation with the device kernel.

In particular, and with reference now to the example scenarios listed above, the following are example processes that can be performed. Scenario (1)—since there is no static address put on the interface, all that needs to be done is to add the IPv6 address to the interface. For the alias, the address is not added to the alias but rather to the base interface. For example, and with reference to the examples of FIGS. 6*a* and 6*b*, eth3a:40 would be the alias and eth3a is the base address. Scenario (2)—for aliases, DHCP is not allow to add an address, therefore there is nothing to do for the alias. Scenario (3)—first, the IPv4 address has to be removed from the alias. This can be done by setting the IPv4 address to zero, but it can also be done by putting the alias interface down, that is, disabling the alias interface. The IPv6 address is added to the base address but it is saved by the configuration application under the alias name. Scenario (4)—for aliases, DHCP is not allow to add an address, so there is nothing to do for the alias. Scenario (5)—first, the IPv6 address associated with the alias has to be removed from the base interface. This is done by performing a delete 'del' of the IPv6 address on the base interface. The IPv6 address is added to the base address but it overwrites the old IPv6 address that was saved by the configuration application under the alias name. Scenario (6)—for aliases, DHCP is not allow to add an address therefore there is nothing to do for the alias. Scenario (7)—first, the IPv6 address associated with the alias has to be removed from the base interface. This is performed by doing a delete 'del' of the IPv6 address on the base interface. The IPv4 address is added to the alias which exists in the kernel for IPv4 addresses. The IPv4 address also overwrites the old IPv6 address that was saved by the configuration application under the alias name. Scenario (8)—for aliases, DHCP is not allow to add an address, therefore there is nothing to do for the alias.

With particular reference now to FIG. 7, a method is disclosed for adding a multiple IP addresses to a base interface, one example of which is denoted generally at 700. It will be appreciated that the example scenarios (1)-(8) listed earlier each constitute a variation of the method 700. Moreover, those scenarios can be implemented, in any combination, to produce still further variations of the method 700. Thus, the method 700 is presented solely by way of illustration and is not intended to limit the scope of the invention in any way.

The method 700 can begin at 702 where an alias interface is created, and an IP address assigned to the alias interface. Creation of the alias interface can be performed by a configuration application. The alias interface can be an IPv6 alias interface with an IPv6 alias address and, in at least some embodiments, the alias interface is application-specific. Next, a request is created and transmitted 704, by a configuration application for example, that requests the addition of the alias address of the alias interface to be added to a base interface. The request can be transmitted 704 to a device kernel.

The request for the addition of the alias address to the base interface is received 706 at the kernel. In more detail, the process 706 can involve a library in the application space that communicates with the kernel. Next, the alias address is added 708 by the kernel to the base interface. With this addition of the alias address to the base address at the kernel 708, an application associated with the alias interface can now refer 750 to the alias interface name instead of the address and the configuration program will convert 752 the alias interface name to the corresponding address which, as noted above, can be an IPv6 address. Correspondingly, when interface names are given for applications and the interface is an alias with an IPv6 address, the alias interface address, which now resides on the base interface, can be transmitted 754 to the kernel, and the kernel can convert 756 the alias interface address to the corresponding base interface name. In more detail, the process 756 can involve a library in the application space that communicates with the kernel.

Moreover, because the alias addresses only exist in the configuration application, configuration activities such as adding, deleting, or modifying an alias interface are mapped by the configuration application to an add/delete function of the kernel. In more detail, the alias address is remembered in a database and if the user wants to delete the alias address, that can be done by setting the alias address to zero, similar to the approach used with IPv4 addresses. The kernel will retrieve the address from the database and "add" it to the base interface. Operationally, whenever an operation is performed involving the IPv6 alias interface, such as a ping through the IPv6 alias interface for example, the configuration application converts the IPv6 alias address, requested in connection with the operation, to the base interface that contains the IPv6 address.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    defining an interface stack of a network component, wherein the interface stack is defined as comprising:
        a base level that comprises a first physical slave interface and a second physical slave interface;
        an intermediate level having a virtual bonded interface that represents the first physical slave interface and the second physical slave interface together as a single, unified interface, and neither of the first physical slave interface nor the second physical slave interface has an IP address; and
        a top level comprising a plurality of alias interfaces, and each of the alias interfaces is assigned to a different respective user, wherein the interface stack enables the alias interfaces to communicate with one of the first and second physical slave interfaces by way of the virtual bonded interface;
    creating and assigning a respective alias IP address to each of the alias interfaces; and
    enabling access to the network component interface stack by way of the alias interfaces.

2. The method as recited in claim 1, wherein one of the alias interfaces is an IPv6 alias interface, and the alias IP address of that IPv6 alias interface is an IPV6 alias address.

3. The method as recited in claim 1, wherein the intermediate level is configured to communicate directly with the base level, and the top level is configured to communicate directly with the intermediate level.

4. The method as recited in claim 1, wherein one of the alias interfaces is specific to an application.

5. The method as recited in claim 1, wherein one of the physical slave interfaces is an Ethernet interface.

6. The method as recited in claim 1, wherein the virtual bonded interface has a static IP address.

7. The method as recited in claim 1, wherein an alias IP address assigned to a first one of the alias interfaces is a floating alias IP address that is assignable to a second one of the alias interfaces.

8. The method as recited in claim 1, further comprising receiving, by way of a user interface, user instructions concerning the interface stack.

9. The method as recited in claim 1, wherein the virtual bonded interface is an IPv6 interface.

10. The method as recited in claim 1, wherein the first and second physical slave interfaces have different respective physical configurations.

11. A non-transitory storage medium having stored therein instructions which are executable by one or more hardware processors to perform operations comprising:
    defining an interface stack of a network component, wherein the interface stack is defined as comprising:
        a base level that comprises a first physical slave interface and a second physical slave interface;
        an intermediate level having a virtual bonded interface that represents the first physical slave interface and the second physical slave interface together as a single, unified interface, and neither of the first physical slave interface nor the second physical slave interface has an IP address; and
        a top level comprising a plurality of alias interfaces, and each of the alias interfaces is assigned to a different respective user, wherein the interface stack enables the alias interfaces to communicate with one of the first and second physical slave interfaces by way of the virtual bonded interface;
    creating and assigning a respective alias IP address to each of the alias interfaces; and
    enabling access to the network component interface stack by way of the alias interfaces.

12. A physical device, comprising:
    an interface stack comprising:
    a base level comprising a physical interface that includes a first physical slave interface and a second physical slave interface;
    an intermediate level having a virtual bonded interface that represents the first physical slave interface and the second physical slave interface together as a single, unified interface, and neither of the first physical slave interface nor the second physical slave interface has an IP address; and
    a top level comprising a plurality of alias interfaces, each of which corresponds to a different respective user, and each of the alias interfaces is arranged for communication with one of the first and second physical slave interfaces by way of the virtual bonded interface, and wherein each alias interface has a respective alias IP address, and the interface stack is accessible to another device by way of one or more of the alias interfaces.

13. The physical device as recited in claim 12, wherein one of the alias interfaces is an IPv6 alias interface, and the alias IP address of that IPv6 alias interface is an IPV6 alias address.

14. The physical device as recited in claim 12, wherein the intermediate level is configured to communicate directly with the base level, and the top level is configured to communicate directly with the intermediate level.

15. The physical device as recited in claim 12, wherein one of the alias interfaces is specific to an application.

16. The physical device as recited in claim 12, wherein one of the physical slave interfaces is an Ethernet interface.

17. The physical device as recited in claim 12, wherein the virtual bonded interface has a static IP address.

18. The physical device as recited in claim 12, wherein the virtual bonded interface is an IPv6 interface.

* * * * *